Figure 1:
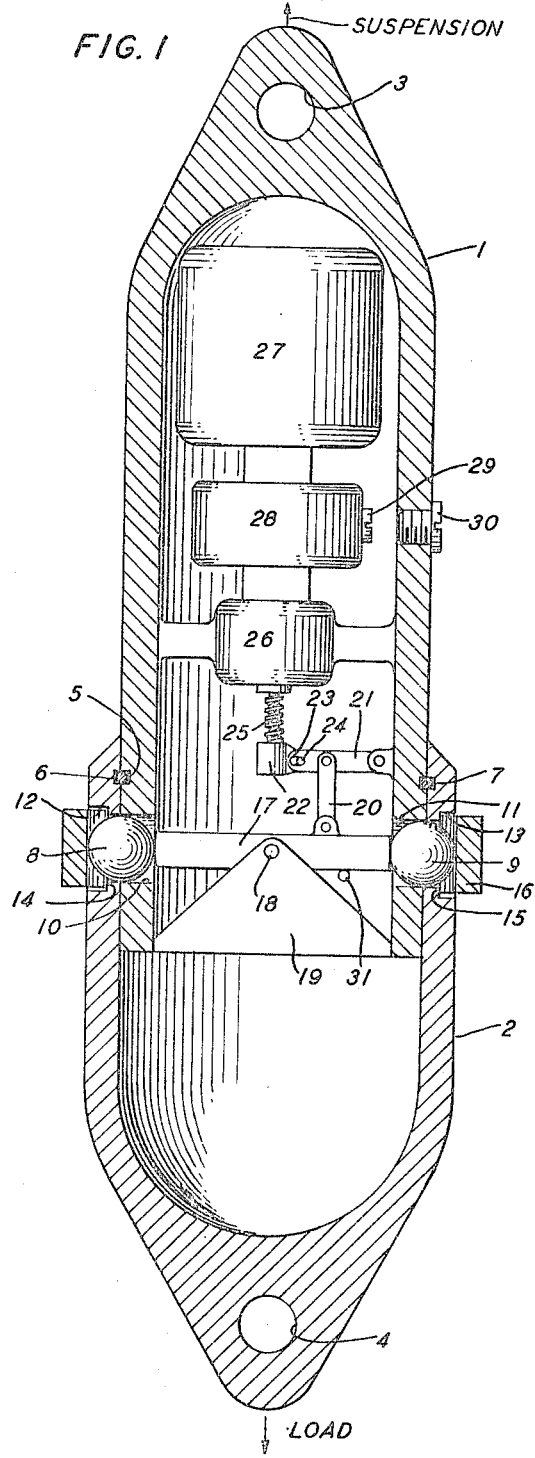

May 16, 1967  A. E. MELHOSE  3,319,978
TIMED RELEASE COUPLING
Filed Aug. 25, 1964  2 Sheets-Sheet 1

INVENTOR
A. E. MELHOSE
BY
D. Stoddard
ATTORNEY

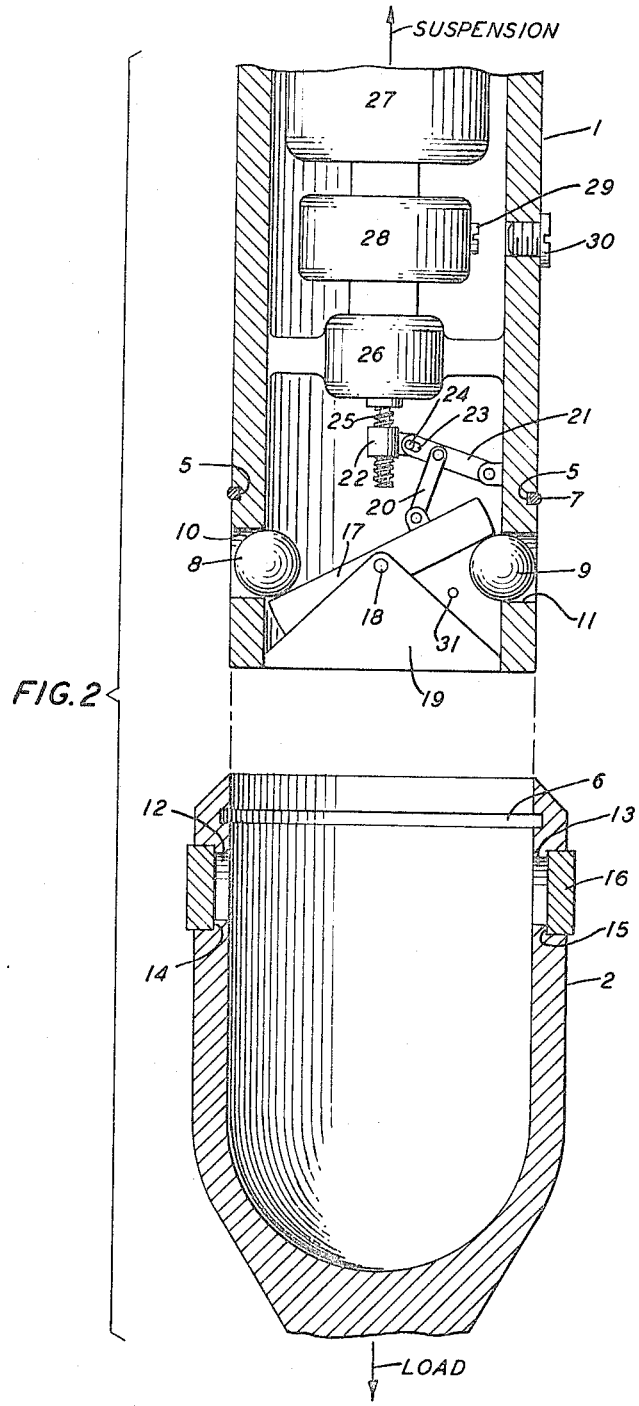

United States Patent Office 3,319,978
Patented May 16, 1967

3,319,978
TIMED RELEASE COUPLING
Alfred E. Melhose, Watchung, N.J., assignor to Bell Telephone Laboratories, Incorporated, New York, N.Y., a corporation of New York
Filed Aug. 25, 1964, Ser. No. 392,052
3 Claims. (Cl. 285—18)

This invention relates to devices for coupling two objects together and, more particularly, to a timed release coupling for temporarily connecting two objects and for subsequently releasing them after the expiration of a preassigned time interval.

In various types of equipment, there is a need for apparatus, such as load-releasing equipment, which will couple or link two devices together and subsequently release them. The design requirements of such linking apparatus become complicated when the uncoupling of the devices is specified to occur at a remote and relatively inaccessible location. For example, certain types of equipment include devices which are to be linked together and then delivered to a distant location where, due to the nature of the location, they are to be uncoupled automatically.

One embodiment of this type of load-releasing equipment includes an electronic device which is required to be placed at a specified location on the bottom of a large body of water, such as an ocean, particularly at a great depth. The equipment also includes a lowering device for conveying the electronic device to its specified position on the ocean floor. The equipment further requires a coupler which will temporarily connect the lowering device to the electronic device and which will release or disconnect them after the electronic device has been conveyed to its assigned location on the ocean floor.

Accordingly, it is an object of this invention to provide an improved coupler for connecting two objects together.

Another object of the invention is to provide an improved coupler, or load-releasing equipment, for temporarily connecting two objects and for subsequently releasing them.

A more specific object of the invention is to provide an improved timed release coupling mechanism for joining two objects together and for later releasing them automatically after the expiration of an assigned time interval.

These and other objects of the invention are attained by employing a coupler having two linking members with an end portion of one member adapted to encompass the end portion of the other member. Means are provided for attaching each of the linking members to a respectively different one of the two objects that are to be coupled together. The linking members are normally held together by means of at least one locking member inserted through their juxtaposed end portions. Resilient means tend to force the locking member out of its inserted position, but this movement is normally blocked by an instrumentality which is pivotally mounted inside one of the linking members.

The coupler further includes electroresponsive means which are designed to operate at the end of an assigned time interval and which function to turn the instrumentality about its pivot thereby unblocking the movement of the locking member. This action enables the resilient means to force the locking member out of its inserted position thereby effecting the release of the linking members. This serves to uncouple the two devices that were originally connected together thereby enabling the lowering device to be retrieved while the electronic device remains at its assigned location on the ocean floor.

These and other features of the invention are more fully discussed in connection with the following detailed description of the drawing in which:

FIG. 1 is a sectional side view of an exemplary timed release coupling apparatus in which the features of this invention are embodied; and FIG. 2 is a sectional side view of a major portion of the coupling apparatus with its release mechanism in its operated condition for performing the uncoupling operation.

The exemplary embodiment of the coupling apparatus of this invention is shown in FIG. 1 to comprise an upper body or linking member 1 and a lower body or linking member 2. The linking members 1 and 2 are each provided with means defining a hole 3 and 4, respectively, through which ropes or cables can be inserted for attaching the linking members 1 and 2 to the particular objects that are to be coupled together. For example, the lowering device, mentioned above, can be fastened to the upper linking member 1 by means of a cable which can be inserted through the hole 3. Similarly, the above-mentioned electronic device can be secured to the lower linking member 2 by means of a rope which can be inserted through the hole 4. Thus, the means defining the hole 3 constitute supporting or suspending means while the means defining the hole 4 constitute load-attaching means.

The linking members 1 and 2 are made of suitably strong material, such as steel, and are essentially cylindrical in shape except that, as was just stated, each has a closed end for providing means defining the holes 3 and 4. As is shown in FIG. 1, the lower linking member 2 has a larger diameter than the upper linking member 1 so that its open end portion can encompass the open end portion of the upper linking member 1. It is to be noted that the internal diameter of the lower member 2 exceeds the outer diameter of the upper member 1 by only a very small amount so as to produce a close sliding fit between the two members 1 and 2. Thus, the upper member 1 can slide into the lower member 2 in a manner similar to that in which one section of a telescope slides into another section.

If desired, a circumferential groove 5 may be cut in the outer surface of the upper member 1 and a similar groove 6 can be cut in the inside surface of the lower member 2, as is best shown in FIG. 2. A conventional O ring seal 7 may be placed in the grooves 5 and 6 at the time when the linking members 1 and 2 are joined together. This would serve to prevent water from entering the chamber formed by the connected interiors of the members 1 and 2.

After the lower portion of the upper linking member 1 has been inserted into the open end of the upper portion of the lower linking member 2, the members 1 and 2 are held or fastened together by means which include one or more locking members. In this embodiment of the invention, the locking members are constituted by balls 8 and 9 which are made of a suitable material, such as hard steel. It is to be understood that the invention is not limited to the use of two balls 8 and 9 but could instead employ a larger number or only one. The number of balls that are chosen to be used determines their size because they should be sufficiently strong to withstand the shear force exerted by the load.

The fastening means also include means in the lower portion of the upper linking member 1 for defining two holes 10 and 11. The diameters of the holes 10 and 11 exceed the diameters of the balls 8 and 9 by only a very small amount so as to result in a close fit between them. However, the fit is not so tight as to bind the balls 8 and 9 because they should be able to move freely into and out of the holes 10 and 11. For the purpose of preventing water from entering through the holes 10 and 11, a suitable water-excluding seal may be used. This seal may conveniently be in the form of a coating of appropriate material, such as molybdenum disulphide, applied to the balls 8 and 9.

Similarly, the upper portion of the lower locking member 2 has means defining two holes 12 and 13 which are best seen in FIG. 2. The holes 12 and 13 are the same size as the holes 10 and 11 and are so located as to be aligned therewith when the open end portions of the linking members 1 and 2 are juxtaposed with the upper end of the lower member 2 encompassing the lower end of the upper member 1. It is to be noted that the outer portion of each of the holes 12 and 13 has an enlarged diameter for providing a seat 14 and 15, respectively, for accommodating a circular spring 16 which holds the balls 8 and 9 in place. If desired, the cut-out portions represented by the seats 14 and 15 can be extended completely around the outer periphery of the lower locking member 2 so as to form a circumferential groove or channel for receiving the spring 16.

This circular spring 16 is made of suitable resilient material, such as spring steel, and is similar to a split piston ring. The spring 16 is designed to encircle the lower linking member 2. The spring 16 is so proportioned that, when it is properly positioned, it tends to press the locking members, represented by the balls 8 and 9, out of their inserted positions in the holes 10, 11, 12, and 13. In other words, the resilient force of the spring 16 tends to impel the balls 8 and 9 to move into the interior chamber of the upper linking member 1. Thus, the spring 16 constitutes ejecting means for moving the balls 8 and 9 out of the holes 10, 11, 12, and 13. However, this movement is normally blocked by a pivoted instrumentality or bar 17 which is normally mounted in a horizontal position inside the upper locking member 1 for functioning in the manner of a toggle lock bar.

The bar 17 is pivoted at its center on a pivot 18 which is held by a supporting member 19 that is fixedly attached to the upper linking member 1 by any suitable means, such as screws. It can be seen in FIG. 1 that the length of the bar 17 is approximately equal to the inside diameter of the linking member 1 so that, when the bar is in its horizontal position, it blocks the egress of the balls 8 and 9 from the holes 10 and 11. Thus, this horizontal position of the bar 17 may be termed its locking position because it functions to hold the balls 8 and 9 in the holes 10, 11, 12, and 13 thereby locking together the linking members 1 and 2. Thus, the bar 17 constitutes holding means for holding the balls 8 and 9 in their inserted positions.

In order to move the toggle lock bar 17 out of its horizontal position so that the balls 8 and 9 can be released for disconnecting the linking members 1 and 2, the bar 17 is provided with a toggle lift arm 20. The lower end of the arm 20 is pivotally secured to the bar 17 while the upper end of the arm 20 is pivotally attached to a toggle actuating arm 21. This arm 21 is normally disposed in a position parallel to the toggle lock bar 17 and has one end pivotally fastened to the inside wall of the upper linking member 1. The other end of the actuating arm 21 is slidably attached to a collar 22 in any suitable manner, such as by providing the end of the arm 21 with a slot 23 which is fitted over a pin 24 on the collar 22.

The collar 22 is made with a threaded bore so that it can be mounted on a driving worm gear 25. The worm gear 25 is attached to the shaft of a motor 26 which is operated by direct current supplied from a battery 27 of any suitable design, such as the silver zinc type. It is to be noted that the application of current from the battery 27 to the motor 26 is controlled by a timing device 28 which is interposed therebetween. The timer 28 may be of any appropriate design and may be operated by direct current from the battery 27. The motor 26, battery 27, and timer 28 are each suitably mounted securely inside the upper locking member 1 so as to withstand any vibrations or impacts which might result from rough handling of the apparatus.

The timer 28 is equipped with a control screw 29 which can be preset for the purpose of adjusting the delay period of the timer 28. In order to provide access to the control screw 29, a hole is cut in the wall of the upper linking member 1 at a position directly facing the screw 29. This hole is of sufficient size to permit the easy insertion of a screwdriver for adjusting the control screw 29. Normally, the hole is covered by means of a threaded entry plug 30. Thus, by temporarily removing the plug 30, the delay period of the timer 28 can be varied by adjusting the position of its control screw 29.

At the expiration of the delay period, the timer 28 will transmit electric power from the battery 27 to the motor 26. This will cause the motor 26 to rotate the worm gear 25. Since the collar 22 is prevented from rotating due to its attachment to the actuating arm 21, it will travel up the worm gear 25 from its lower position shown in FIG. 1 to its higher position shown in FIG. 2. The upward movement of the collar 22 will carry with it the toggle actuating arm 21 and the toggle lift arm 20 thereby tilting the toggle lock bar 17 about its pivot 18 in the manner indicated in FIG. 2. This action serves to move the bar 17 into a position for unblocking the movement of the balls 8 and 9.

Accordingly, the distortion force of the circular spring 16 will now be permitted to push the balls 8 and 9 out of their inserted positions in the holes 10, 11, 12, and 13, as is shown in the upper portion of FIG. 2, while the spring 16 enters into the seats 14 and 15 or their equivalent circumferential channel, as is represented in the lower portion of FIG. 2. This movement of the balls 8 and 9 serves to unlock the linking members 1 and 2 and to thereby effect their release together with the release of the objects attached to them. In other words, the body or linking members 1 and 2 are adapted to become detached from each other in response to the movement of the locking members, constituted by the balls 8 and 9, out of the holes 10, 11, 12, and 13.

In using this timed release coupling, such as for releasing a load at a specified location on the ocean floor, particularly at a great depth, the unassembled equipment is carried on a ship to a position above the desired location. At this point, a lowering cable is attached to the hole 3 in the upper linking body member 1 and the load, which may be an electronic device, is secured to the hole 4 in the lower linking body member 2. The collar 22 has been previously placed on the worm gear 25 at its lower position shown in FIG. 1 so that the toggle actuating arm 21 and the toggle lift arm 20 have moved the toggle lock bar 17 to its horizontal position with its ends directly opposite the holes 10 and 11. If desired, a stop 31 may be provided for insuring the alignment of the bar 17 with the holes 10 and 11.

The upper body member 1 is then inserted into the lower body member 2 to a sufficient distance for aligning the holes 12 and 13 with the holes 10 and 11. The balls 8 and 9 are now inserted into the aligned holes 10, 11, 12, and 13. The above-mentioned water-excluding sealing coating may be applied to the balls 8 and 9 prior to their insertion or, if desired, the sealing material may be injected into the aligned holes 10, 11, 12, and 13 after the balls 8 and 9 have been inserted therein. Next, the circular spring 16 is placed around the lower body member 2 in the proper position for holding the balls 8 and 9 in place. Thus, except for setting the timer 28, the equipment is ready for lowering.

Assuming that the depth of the water is known and that the rate of lowering the equipment can be controlled, then the time required for the descent can be calculated. Accordingly, just before the start of the lowering operation, the entry plug 30 is removed to provide access to the control screw 29 and the timer 28 is adjusted or set for the calculated time interval. The plug 30 is then inserted into the upper linking member 1, as is shown in FIG. 1, and the equipment is overboarded into the water and is lowered to the specified location on the ocean floor.

At the expiration of the preassigned time interval, the timer 28 will start the motor 26. The resulting rotation of the worm gear 25 will raise the collar 22 to effect the tilting of the toggle lock bar 17 in the manner described above. This will permit the spring 16 to force the balls 8 and 9 out of the holes 10, 11, 12, and 13 thereby effecting the unlocking or release of the linking body members 1 and 2. The weight of the lower body member 2 together with the weight of the load constituted by the electronic device now function to cause the lower body member 2 to slide off the upper body member 1. By pulling up the lowering cable that is attached to the hole 3, the upper body member 1 can be retrieved while leaving the lower body member 2 and the electronic device at the desired location on the ocean floor.

What is claimed is:

1. A detachable coupler having two linking members with an end of one normally encompassing an end of the other,
   said coupler further comprising means defining a hole in each of said ends,
   said holes normally being aligned with each other,
   a locking member normally inserted in said holes for detachably holding said linking members together,
   resilient means tending to eject said locking member from said holes,
   a pivoted instrumentality normally in a position for blocking the ejection of said locking member from said holes,
   and electroresponsive means for tilting said pivoted instrumentality into a position for unblocking the ejection of said locking member from said holes,
   said linking members being adapted to become detached from each other in response to the ejection of said locking member from said holes.

2. A timed release coupling for temporarily connecting two objects and for subsequently releasing them after the expiration of a preassigned time interval,
   said coupling comprising two linking members each having means for attachment to a respectively different one of said objects,
   locking means for temporarily locking said linking members together,
   said locking means including a plurality of balls,
   each of said linking members having means defining holes therein for separately receiving at least a portion of each of said balls, said holes in one linking member being aligned with said holes in the other linking member,
   a movable retaining member normally in a position for retaining said balls in their received positions in said linking members for locking said members together,
   and releasing means for unlocking said linking means after the expiration of said preassigned time interval,
   said releasing means including actuating means adapted for moving said retaining member to a position for releasing said balls from their retained positions,
   operating means responsive to the expiration of said preassigned time interval for operating said actuating means,
   and resilient ejecting means for ejecting said balls from their received positions in said linking members in response to the movement of said retaining member to its second-mentioned position.

3. A timed release coupling having two linking members adapted for being temporarily locked together and for being subsequently unlocked after the expiration of a preassigned time interval,
   each of said linking members having an end portion with the end portion of one being adapted normally to encompass the end portion of the other,
   means defining at least one hole in each of said end portions,
   said holes being aligned with each other,
   at least one locking member having a size that permits it to pass through said holes,
   said locking member being adapted normally to lock said linking members together by being inserted in said holes with a portion thereof in said hole in one linking member and an equal portion in said hole in the other linking member,
   resilient means adapted for impelling said locking member to move out of said holes and into the interior of said encompassed end portion thereby unlocking said linking members,
   said resilient means being normally mounted on the exterior surface of said encompassing end portion in a position for blocking the egress of said locking member from said hole therein,
   a rigid instrumentality pivotally mounted inside said encompassed end portion,
   holding means for normally holding said instrumentality in a position for blocking the egress of said locking member from said hole in said encompassed end portion,
   and time-responsive means for unlocking said linking members,
   said time-responsive means being responsive to the expiration of said preassigned time interval for actuating said holding means for moving said instrumentality to a position for unblocking the egress of said locking member from said hole in said encompassed end portion.

References Cited by the Examiner

UNITED STATES PATENTS

| 2,420,746 | 5/1947 | Heidman et al. | 294—83.1 |
|---|---|---|---|
| 2,525,037 | 10/1950 | Krapp | 285—312 |
| 3,116,895 | 1/1964 | Mitchum | 285—18 X |
| 3,237,147 | 2/1966 | Elliott et al. | 285—276 X |
| 3,251,301 | 5/1966 | Herrmann | 102—495 |

References Cited by the Applicant

UNITED STATES PATENTS

| 2,131,445 | 9/1938 | Lawton. |
|---|---|---|
| 2,270,317 | 1/1942 | Larson. |
| 2,732,245 | 1/1956 | Lemoigne. |
| 2,868,580 | 1/1959 | Stevens et al. |
| 2,904,369 | 9/1959 | Campbell. |

CARL W. TOMLIN, *Primary Examiner.*

R. G. BERKLEY, *Assistant Examiner.*